United States Patent
Franz et al.

[11] Patent Number: 6,091,071
[45] Date of Patent: *Jul. 18, 2000

[54] OPTO-ELECTRONIC SENSOR

[75] Inventors: Thomas Franz, Denzlingen; Gerhard Alt, Sexau; Guenter Hirt, Hasslach; Daniel Kietz, Riegel, all of Germany

[73] Assignee: Sick AG, Waldkirch/Breisgau, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/844,033

[22] Filed: Apr. 18, 1997

[30] Foreign Application Priority Data

Apr. 18, 1996 [DE] Germany ............... 296 07 076 U

[51] Int. Cl.⁷ .................................................. G01N 21/90
[52] U.S. Cl. .................... 250/372; 250/373; 250/365; 250/360.1; 250/358.1; 250/301; 436/1; 422/55
[58] Field of Search ..................... 250/372, 373, 250/365, 360.1, 358.1, 301; 436/1; 422/55

[56] References Cited

U.S. PATENT DOCUMENTS

| | | | |
|---|---|---|---|
| 4,359,640 | 11/1982 | Geiger | 250/372 |
| 5,134,278 | 7/1992 | Nelen | 250/223 B |
| 5,327,356 | 7/1994 | Lang et al. | 364/498 |
| 5,331,167 | 7/1994 | Hoshino et al. | 250/372 |
| 5,436,459 | 7/1995 | Koch et al. | 250/373 |
| 5,498,872 | 3/1996 | Steadman . | |
| 5,663,791 | 9/1997 | Smith . | |

FOREIGN PATENT DOCUMENTS

| | | |
|---|---|---|
| 0176826 | 4/1986 | European Pat. Off. . |
| 4343457C1 | 10/1994 | Germany . |
| 1376304 | 12/1974 | United Kingdom . |
| 2178841A | 2/1987 | United Kingdom . |

*Primary Examiner*—Constantine Hannaher
*Assistant Examiner*—Andrew Israel
*Attorney, Agent, or Firm*—Townsend and Townsend and Crew LLP

[57] ABSTRACT

An opto-electronic sensor for recognizing transparent articles, such as, for example, glass bodies, plastic bodies, or foils. The sensor includes at least one transmitter for transmitting light signals into a monitored region, at least one receiver for receiving the transmitted light signals, and at least one evaluation unit for the evaluation of the received signals. The transmitter is designed for the transmission of the light signals in the UV range. At least one reference transmitter is provided for the transmission of light signals into the monitored region. The light signals transmitted by the reference transmitter lie in a different frequency range from the light signals transmitted by the transmitter.

42 Claims, 2 Drawing Sheets

OPTO-ELECTRONIC SENSOR

FIELD OF THE INVENTION

The invention relates to an opto-electronic sensor for the recognition of transparent articles, such as for example, glass bodies, plastic bodies, or foils, the sensor comprising at least one transmitter for transmitting light signals into a monitored region, at least one receiver for receiving the transmitted light signals and also at least one evaluation unit for the evaluation of the received signals

BACKGROUND OF THE INVENTION

The recognition of transparent articles in industry (manufacture of foils, packaging plants, manufacturing of bottles, filling plants, etc.) is a technically demanding task which cannot always be satisfactorily solved by the initially named sensors.

In accordance with the prior art, different principles of solution exists for accomplishing said task:

If the degree of cloudiness of the material to be detected is sufficient, then customary, light barriers with an adapted sensitivity are used.

Furthermore, the polarization characteristics or depolarization characteristics of the transparent articles to be detected can be exploited for their recognition in as much as an attempt is made to evaluate the signal change which occurs as a result of the named characteristics.

The signals delivered by the sensor can be investigated to see whether a pronounced surface reflection and also simultaneously an adequate attenuation can be recognized from which a conclusion can be drawn regarding the presence of a transparent object.

Finally, sensors are known which operate with UV burners and which can detect the transmission changes in the UV range produced by the transparent objects.

In the realization of the above-named known principles, it is necessary to operate with very high system sensitivities as a result of the low attenuation of the materials to be recognized, in order to be able to reliably recognize also materials with a high transmissivity. This necessarily leads to a situation in which the reliability of such systems is impaired by faulty switching, for example, as a result of surface reflections or of disturbing optical radiation.

Since the transparent articles to be recognized frequently have depolarization characteristics which make the evaluation more difficult, the above-named evaluation of the depolarization characteristics cannot always lead to the desired result of the reliable recognition of transparent articles. The evaluation is additionally made more difficult by the fact that the transparent articles have, under certain circumstances, refractive effects (for example lens action with filled bottles) in addition to pronounced surface reflections which are, for example, produced by smooth surfaces, and a low optical attenuation, so that the optical beam flux through the transparent article is not attenuated in the desired manner, but is rather even increased.

A basic problem of the known sensors consequently lies in the fact that they can only reliably recognize quite specific articles which are to be detected.

The sensors which are likewise mentioned above, which operate with UV lamps, make use of the pronounced changes in transmission of the article to be detected in the near UV spectrum. These sensors show, however; as a result of the UV or quartz lamps that are used, a relatively low working life which brings about an increased servicing requirement. The use of the said lamps, moreover, does not correspond to the expected standard of modern industrial sensors because of the required constructional size.

A further substantial problem with the known sensors lies in the fact that the measurement signals that are received are, falsified by disturbing influences. Disturbances are for example, produced by aging or degradation of the components that are used, in particular of the transmitter, by drifting, by contamination, by surface reflection, by lens and mirror effects brought about by the articles to be recognized, and also by temperature influences, in particular, by the temperature dependent plot of the power of the transmitter that is used.

OBJECT OF THE INVENTION

An object of the invention is to design an opto-electronic sensor of the initially named kind in such a way that, while being economical to manufacture, it is able to reliably recognize transparent articles with high sensitivity and, in particular, the influences of disturbing signals are to be eliminated.

BRIEF DESCRIPTION OF THE INVENTION

The solution of the object in accordance with the invention lies in designing the transmitter to transmit light signals in the UV range and in providing at least one reference transmitter or the transmission of light signals into the monitored region, with the light signals transmitted by the reference transmitter lying in a different frequency range than the light signals transmitted by the transmitter.

Thus, a measurement signal of a first wavelength and a reference signal of a second wavelength are generated, with the two signals being transmitted into the monitored region. In this manner, a situation is achieved in which the reference signal, which has the second wavelength, essentially reproduces only signal changes of the measurement signal of the first wavelength which are attributable to disturbing influences but are not, however, necessarily effected by the absorption which takes place at the article to be detected. By a suitable offset calculation of the measurement signal and the reference signal, the disturbing influences can then be eliminated from the measurement signal that is received.

Thus, a situation is achieved with the invention in which transparent objects can be detected largely free of errors and reliably. Since the disturbing effects attributable to contamination can also be eliminited in accordance with the invention, the required service cycles can be extended.

The offset calculation of the measurement signal and the reference signal can take place in accordance with the invention with little complexity if, for each measurement, both the measurement signal and also the reference signal are found, which can then be directly compared with one another. The execution of this direct comparison can be realized by a particularly simple electronic circuit when the measurement signal and the reference signal are transmitted and received simultaneously. A circuit of this kind can then, for example, do away with the storage or delaying of a detected signal and also of the reading-in of the already stored reference values and it can, in this case, consist, for example, of a comparator.

An electronic circuit of the sensor of the invention with the offset calculation of the measurement signal and the reference signal furthermore has the advantage that no separate threshold circuit respectively associated with the measurement signal or the reference signal need by provided in order to adapt the sensitivity of the sensor to a particular application, or to compensate for age-dependent changes of one of the channels: By means of a direct comparison of the signals of the two channels, the sensor can always be operated with the highest sensitivity which is permitted by the comparison circuit used. In this way, the manufacturing costs and also the servicing and calibration costs and complexity can be reduced.

The sensitivity of the sensor can also be kept stable over long periods of time by the elimination of the disturbing influences in accordance with the invention. Thus, it is possible to operate in advantageous manner with teach-in functions, because values which have been learned once are valid over long periods of time.

The principle of the invention is based on the spectral absorption of the article to be recognized. Most customary transparent materials, such as, for example, glass and PET bottles, foils, plastics, glass sheets etc. exhibit pronounced attenuation in the near UV range and are thus reliably detectable. The sensor of the invention is accordingly widely usable for the detection of flat, round and hollow bodies and also foils. Possibilities of use are present, in particular, in the area of the drinks industry, of the drink packaging industry, and also in the manufacture of glass and plastic.

A sensor of the invention functions particularly well when the wavelength of the measurement signal is so selected that it experiences the greatest possible absorption at transparent objects, whereas the wavelength of the reference is selected so that only the lowest possible absorption occurs. The measurement signal is consequently dependent on the absorption which takes place, and also on the disturbances which arise, whereas the reference signal is dependent solely on the disturbances which arise.

The wavelength of the reference signal can in this respect be selected such that the reference transmitter transmits light signals in the visible frequency range.

It is preferred when the light signals transmitted by the reference transmitter are of substantially the same optical path as the light signals transmitted by the transmitter, at least within the monitored region. In this manner, a situation is achieved in which both the reference signal and also the measurement signal are subjected to the same disturbing influences.

Once the light beams which are produced have left the sensor, the beam path of the signals of the two wavelengths should have the same geometrical alignment and also the same directional characteristics. The transmitted light beams can, in this arrangement, be transmitted directly by the light source, or by the light sources, or indirectly via a corresponding optical system.

If one operates with two signal of different wavelength in accordance with the invention, then a signal separation is necessary both at the transmitter side and also at the receiver side.

For this purpose, a single light source can be provided at the transmitter side which emits the different wavelengths. In just the same way it is possible to provide two or more different emitting sources.

In a preferred embodiment, the transmitter and the reference transmitter are designed for simultaneous operation, in particular for the simultaneous transmission of the signals having different wavelengths. This is because in this manner, it can be ensured that disturbing signals that vary timewise, or a time change of the spatial position, or the arrangement of the article to be recognized, each have identical effects on the measuring signal and on the reference signal.

For the reception of the light signals transmitted by the reference transmitter a reference receiver can be provided. In this respect it is possible for the receiver for the reception of the measurement signal, and for the receiver for the reception of the reference signal to be formed by one and the same reception element. As an alternative, however, two different receiving elements can also be provided.

It is preferred, when an optical and/or electronic divider is provided, to separate the received signals with different wavelengths. The divider can, for example, be formed as a dichroitic divider.

In just the same way the divider can also be formed as a semi-permeable mirror which has a high reflectivity for UV light and a high permeability for the light transmitted by the reference transmitter, or high permeability for UV light and a high reflectivity for the light transmitted by the reference transmitter.

The divider can furthermore be formed as a geometrical or physical divider, with filters, in particular, edge filters to block out the received signals associated with the other respective receiver being arranged in front of the receiver and/or of the reference receiver.

Through the above-described measures, an optical separation of two channels (measurement signal and reference signal) is thus achieved at the receiver side. An electronic separation is, however, likewise possible.

In the context of the electronic signal separation, the light sources that are used with the two different wavelengths (measurement signal and reference signal) can be energized with different signal sequences. At the receiver side it is then possible to feed two receivers with the received light via a customary physical/geometric divider and to filter out the corresponding channel via the respective modulation frequency. It is, however, also conceivable to use only one single receiver and to sequentially evaluate the different pulse sequences of the two channels.

In the context of an electronic, receiver side, signal separation, it is advantageous when the transmitter and/or reference transmitter are formed to transmit pulse-like light signals, in particular, periodic pulse-like light signals.

For the evaluation of the measurement signal and the reference signal, an evaluation unit can be provided which, for example, includes a comparison unit for the comparison of the light signals received from the receiver and the reference receiver and which generates an article detection signal from the result of the comparison. The comparison unit can thereby be formed as a divider unit for the division of the levels of the light signals received from the receiver and the reference receiver.

In the following, an example of a possible evaluation method for the signals generated by a sensor in accordance with the invention will be explained, with the following relationships applying:

$\lambda_1$: wavelength of the measurement transmitter $\lambda_2$: wavelength of the reference transmitter $I_{\lambda 1}$: signal level of the measurement signal receiver $I_{\lambda 2}$: signal level of the reference signal receiver $TF_{\lambda 1}$: transmission factor of the wavelength $\lambda_1$ $TF_{\lambda 2}$: transmission factor of the wavelength $\lambda_2$ VF: contamination factor (wavelength independent)

$F_{Li}$: lens action factor (wavelength independent)

$F_{Re}$: reflection factor (wavelength independent)

With a free beam path, i.e when the article is located in the monitored region, the light of the wavelength $\lambda_1$, and also the light of the wavelength $\lambda_2$ is not attenuated. The light of the wavelengths $\lambda_1$ and $\lambda_2$, which is, for example, passed via a dichroitic divider to the two receivers (measurement signal receiver and reference signal receiver), leads to corresponding signal levels $I_{\lambda 1}$ and $I_{\lambda 2}$ which are suitably mathematically linked to one another. An example for such a linkage is a division:

$$\frac{I_{\lambda 1}}{I_{\lambda 2}} = 1$$

If the above quotient has the value 1 then no object is present in the beam path.

If an object enters into the beam path, a change is detected via the above described example of the quotient method as a result of the different transmission characteristics ($TF_{\lambda 1} < TF_{\lambda 2}$) of the article to be detected with respect to the different wavelengths and it can be concluded from this change that an article is located in the monitored region or in the beam path:

$$\frac{TF_{\lambda 1} \cdot I_{\lambda 1}}{TF_{\lambda 2} \cdot I_{\lambda 2}} < 1$$

A contamination which arises when no article is present in the beam path has the following effect:

The corresponding contamination factor VF which is wavelength independent, enters into the calculation both with the signal level $I_{\lambda 1}$ and also with the signal level $I_{\lambda 2}$ as the same constant factor. This cancels itself out again in the quotient method described by way of example:

$$\frac{VF \cdot I_\lambda}{VF \cdot I_{\lambda 2}} = \frac{I_{\lambda 1}}{I_{\lambda 2}} = 1$$

As a consequence, when a contamination arises which corresponds to the contamination factor VF, it can be stated with certainty that no object is present in the beam path or in the monitored region.

Some articles to be detected cause, in an undesired manner, in addition to the signal attenuation to be detected, a signal increase as a result of lens effects which can, for example, be produced by a filled bottle. With systems which only operate with one wavelength, this signal increase can in unfavorable cases, compensate the desired signal attenuation brought about by the absorption behavior of the article to be detected. Such effects frequently lead, in the prior art, to an undesired multiple switching of the senior or to a non-recognition of articles. A system in accordance with the invention which operates with at least two wavelengths is, however, able to eliminate the named effects of the additional lens action by a suitable mathematical process. As a result of the fact that the lens action enters into effect with the same factor $F_{li}$ in both channels (measurement signal and reference signal), and thus for the two wavelengths $\lambda_1$ and $\lambda_2$, a compensation of the lens action also arises as with the above explained contamination:

$$\frac{F_{Li} \cdot TF_{\lambda 1} \cdot I_{\lambda 1}}{F_{Li} \cdot TF_{\lambda 2} \cdot I_{\lambda 2}} = \frac{TF_{\lambda 1} \cdot I_{\lambda 1}}{TF_{\lambda 2} \cdot I_{\lambda 2}} < 1$$

Since the quotient which has been calculated is smaller than 1, an article located in the beam path can be reliably recognized even if the lens action and the signal attenuation compensate each other for the measurement beam in the described manner.

When a surface reflection of the article located in the beam path also leads in undesired manner to the generation of an additional signal level, then this can also be compensated in accordance with the invention as follows.

As already described above with respect to the lens action, a surface reflection leads to a signal increase which affects both channels (measurement signal and reference signal) with the same factor $F_{\lambda Re}$:

$$\frac{F_{Re} \cdot TF_{\lambda 1} \cdot I_{\lambda 1}}{F_{Re} \cdot TF_{\lambda 2} \cdot I_{\lambda 2}} = \frac{TF_{\lambda 1} \cdot I_{\lambda 1}}{TF_{\lambda 2} \cdot I_{\lambda 2}} < 1$$

Since the calculated quotient is, in this case also less than 1, a conclusion can reliably be drawn regarding the presence of an article, although the signal attenuation and the surface reflection can compensate one another.

The transmitter and/or the reference transmitter can be executed as a semiconductor element, in particular, as a diode. The use of a UV laser diode, of a diode which at least emits radiation in the UV range among other radiation, or of a dice bonded on a carrier element, offers itself in particular.

The transmitter and/or reference transmitter can also be formed as a diode which transmits blue light, with a part of the transmitted light lying in the UV range. Through the above-named designs of the transmitter and/or reference transmitter, an ideally small constructional form of the sensor of the invention can be realized.

The transmitter and/or reference transmitter can preferably include an element which radiates visible light, and also a frequency doubler, by which the radiated visible light can be transformed into the UV range.

The wavelength of the transmitted UV light signals is preferably shorter than 380 nm, in particular, shorter than 350 nm, and preferably shorter than 320 nm.

It is advantageous when an optical system is provided by which the UV light signals are transmitted, with metal optics, mirror systems, quartz optics, diffractive optical element (DOE) and/or Fresnel lenses being used as the optical system.

When using metal optics/mirror system, a situation is achieved in which both the transmitted, and also the received light is not unnecessarily attenuated by a material dependent absorption. Only the terminal windows of the sensor which serve for protection and which are kept thin attenuate the radiation to a small degree. The use of suitably selected optical materials, for example quartz, would also permit a customary optical design.

An optical design using DOE or Fresnel lenses, which under some circumstances can indeed be directly integrated into or onto the corresponding terminal windows of the sensor, is likewise advantageous as a result of the thin material thicknesses, and thus of the lower attenuation which can be achieved in this way. An optical filtering can also be realized in that short-pass filters (in German "Kurzpassfilter") are directly applied onto a terminal window of the sensor. In just the same way, extra components can be provided for the UV filtering.

Having regard to the light rays which are transmitted, it is possible to operate in accordance with the invention with different beam geometries which can, in particular, be adapted by different optical treatments to special customer applications. For example, it is possible to operate with round, polygonal or bar-like beam cross-sections.

It is preferred when a reflection element having, in particular, a low signal attenuation in comparison to the object to be detected is used for the reflection of the transmitted light signals in the direction towards the receiver. The reflection element preferably has substantially the same reflectivity with respect to the wavelength of the reference signal as with respect to the wavelength of the measurement signal. It can be formed as a reflector which is coated on one side and preferably mirror-coated and it can be suitably covered over to provide a better protection against contamination. The use of plastic reflectors, of triple reflectors consisting, in particular, of quartz glass or of reflective oils, for example, "Kugelscotch", is possible. Plastic reflectors which are coated at one side and are in particular, mirror-coated are, cost-favorable and thus advantageous.

The mechanical design of the sensor of the invention can be selected such that the transmitter and receiver branch are optically decoupled from one another in such a way that both indirect and also direct cross-talk is prevented. The transmitter or reference transmitter on the one hand and the receiver or reference receiver on the other hand can be optically separated from one another, in particular, by an off-axis system.

The sensor of the invention can be built-up in accordance with the principle of pupil division or in accordance with the principle of auto-collimation.

The evaluation unit can include a threshold value circuit through which an article detection signal can be produced when the signal falls short of a specific received signal level. The evaluation unit preferably contains a comparison unit to compare the light signals received from the receiver and from the reference receiver so that an article detection signal can be produced in dependence on the result of the comparison.

DESCRIPTION OF PREFERRED EXEMPLARY EMBODIMENTS

Figure 1:
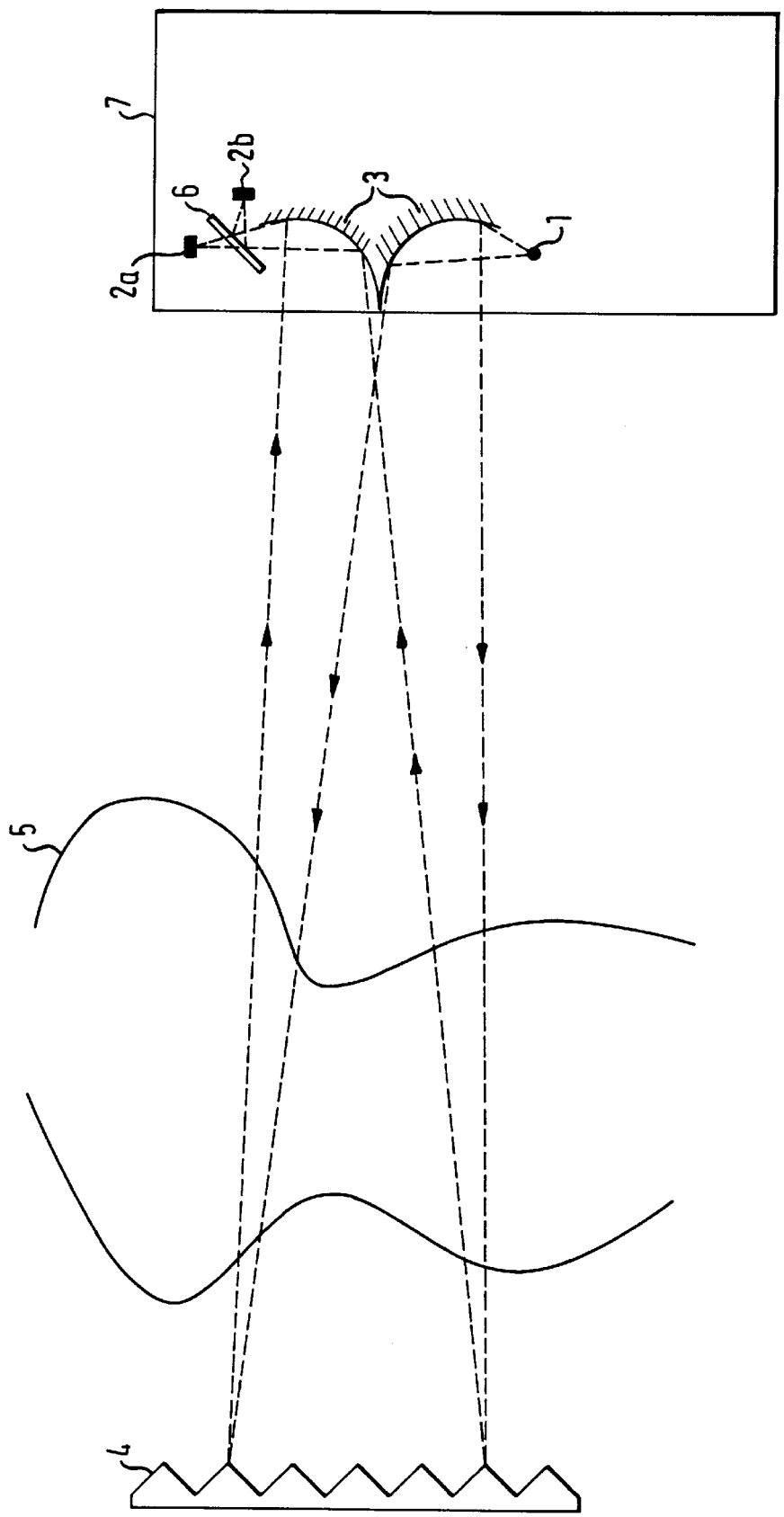
FIG. 1 is the diagrammatic illustration of the principle of an arrangement of an opto-electronic sensor when using a reflection element, a single transmitter element and two different receivers.

FIG. 1 shows an opto-electronic sensor 7 which contains, along an imaginary straight line, a transmitter element 1, a beam divider 6, and a receiver 2a, and which has along-side this imaginary line at the level of the beam divider 6 a second receiver 2b. A reflection element 4 facing the sensor 7 is located at a distance from the sensor 7 and is formed, in this example, as a triple reflector 4. An article 5 to be detected lies between the triple reflector 4 and the sensor 7.

Two concavely arched, off-axis mirrors 3 are arranged alongside one another between the transmitter element 1 and the beam divider 6 of the sensor 7 in such a way that their ends adjacent to the other respective one of the two mirrors 3 contact one another and point in the direction of the triple reflector 4 and in such a way that their ends which are remote from the other respective one of the two mirrors 3 point in the direction of the transmitter element 1 or of the two receivers 2a and 2b respectively. The optical axes of the off-axis mirror 3 thus diverge from one another in V-shaped manner starting from the sensor 7.

The two off-axis mirrors 3 are moreover arranged in such a way that an optical separation of the transmitter and of the receiver channel is completed and thus a direct optical cross-talk between the transmitter element 1 and the receiver, 2a and 2b precluded. Possible light beams paths are drawn in in FIG. 1 as dotted lines which are provided with directional arrows.

The light of the transmitter element 1 has two different wavelengths, namely the wavelength of the measurement signal lying in the UV range and the wavelength of the reference signal which is different from the wavelength of the measurement signal. The light of the transmitter element 1 falls onto the transmitter side off-axis mirror 3 and is reflected by the latter through an exit window of the sensor 7 for transmitted light which is not shown in more detail in FIG. 1, in the direction of the article 5 and the triple reflector 4.

The light of the wavelength of the measurement signal is at least partly absorbed in the article 5, i.e. the measurement signal is initially attenuated. The total light transmitted by the transmitter element 1 and penetrating through the article 5, i.e. the light of both the measurement signal and also of the reference signal, is subjected to possible disturbing effects in the article 5. These disturbing effects can, for example, arise through surface reflections at the article 5, or by lens action of the article 5, and they influence the two different wavelengths of the measurement signal and of the reference signal in the same manner.

The light of the transmitter element 1 strike the triple reflector 4 after passing through the article 5, is reflected from the latter and penetrates the article 5 anew. During this, it can be subjected to the same possible influences as described above.

After passing through the article 5 anew, the light passes through an entry window of the sensor 7 for received light which is not shown in more detail in FIG. 1 and is incident on the receiver side off-axis mirror 3. It is deflected from the latter onto the beam divider 6 which deflects the light in accordance with the wavelength of the reference signal onto the receiver 2b, or which transmits the light in accordance with the wavelength of the measurement signal, in order to strike the receiver 2a without deflection. The beam divider 6 can, for example, be designed as a dichroitic divider.

Since the measurement signal and the reference signal are transmitted by a single transmitter element 1 and are first separated by the beam divider 6, the light of these two signals passes along the same optical path between the transmitter element 1 and the beam divider 6. Accordingly, contaminations or cloudiness at the exit window for transmitted light or entry window for received light of the sensor again acts onto the two signals to the same degree.

Since an optical separation of the measurement signal and the reference signal is achieved at the receiver side by the beam divider 6, and since in each case a respective receiver 2b and 2a is provided for these two signals, an evaluation unit which is not shown in FIG. 1 can evaluate the level of the two signals by a simple direct comparison with respect to the presence of the article 5.

Figure 2:
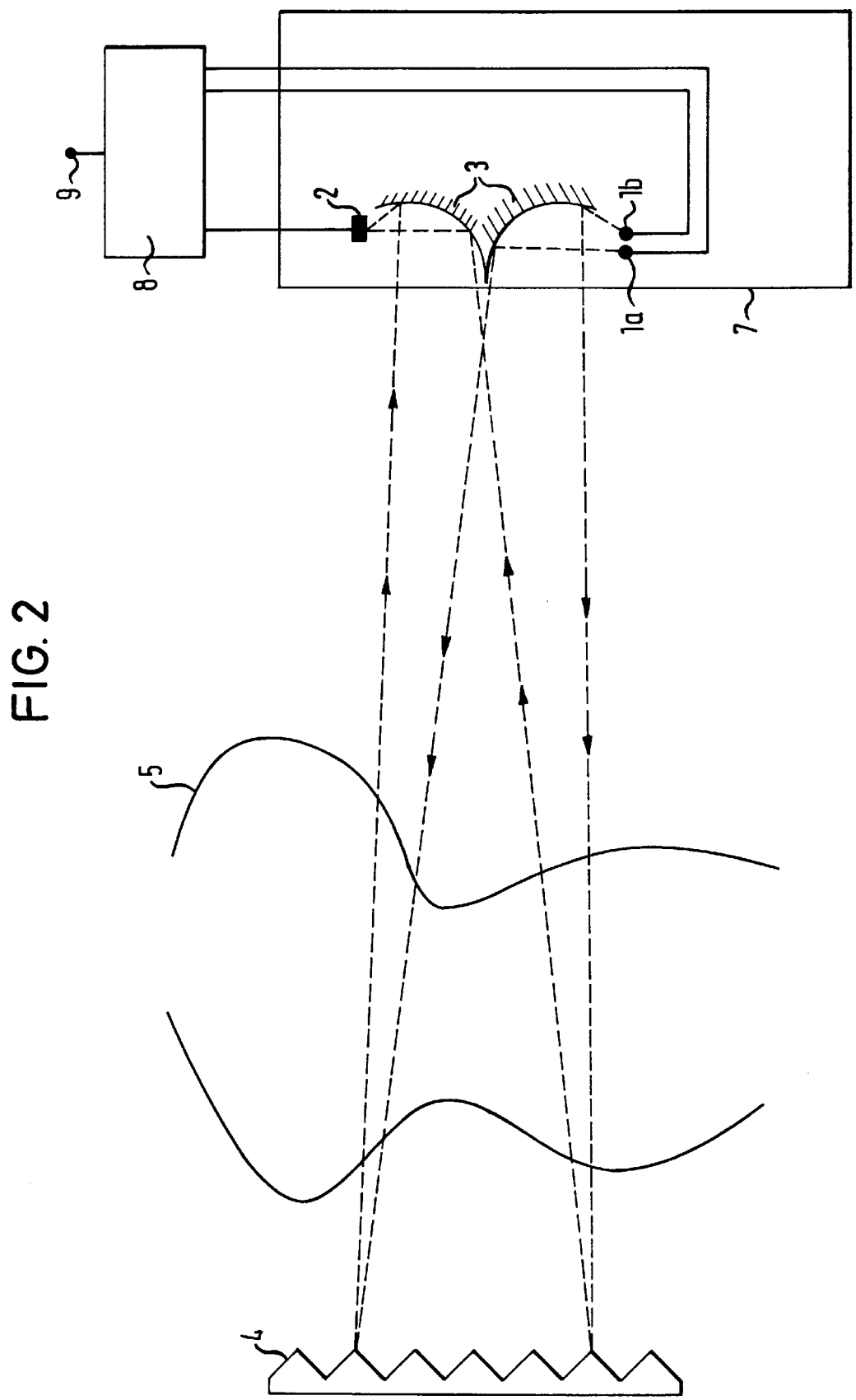
FIG. 2 is the schematic illustration of the principle of an arrangement of an opto-electronic sensor when using one reflection element, two different transmitters and a single receiver element.

FIG. 2 shows a sensor 7, a triple reflector 4 confronting the sensor 7 and serving as a reflection element, and an article 5 to be detected which lies between the sensor 7 and the triple reflector 4. The sensor 7 is built up of two transmitters 1a and 1b which lies spatially close to one another, two concavely arched off-axis mirrors, and one receive element 2, which are arranged in the named sequence substantially on a line which extends perpendicular to the connection line from the sensor 7 to the triple reflector 4. The arrangement of the two off-axis mirrors 3 thereby corresponds, in particular, to the position and alignment already described in connection with FIG. 1.

Moreover, in evaluation unit 6 is shown in FIG. 2 from which electrical connection lines extend to the receiver element 2 and to the transmitters 1a and 1b. The evaluation unit 8 has an output 9.

Light of the UV range is emitted as a measurement signal from the transmitter 1a. The transmitter 1b transmits a reference signal of a different wavelength from that of the measurement signal. The light of the two transmitters 1a and 1b is deflected by the off-axis mirror 3 at the transmitter side in the direction of the triple reflector 4 from which it is reflected. In this arrangement, it penetrates twice through the article 5, namely before and after the reflection at the triple reflector 4, so that in this embodiment, the changes of the measurement signal and of the reference signal can also take place in the manner already described in connection with FIG. 1.

After the second penetration of the article 5, the light of the two transmitters 1a and 1b passes onto the off-axis mirror 3 at the receiver side which deflects it onto the receiver element 2. As a result or the spatial proximity of the two transmitters 1a and 1b, their transmitted beams follow approximately along the same optical path along the described beam path, in particular, in the area of the article 5.

In this embodiment, an electronic separation of the measurement signal and of the reference signal is first provided after the reception of the light. The two signals are energized for this purpose at the transmitter side with different signal sequences, for example, of different frequency, which are also supplied to the evaluation unit 8. The evaluation unit 8 can then correspondingly separate and evaluate the pulse sequences of the signals of the receiver element 2, for example, by the provision of suitable filters. If they register an article 5 in the monitored region by comparison of the measurement signal with the reference signal, then they produce an article detection signal at their output 9. Thus, in this embodiment, which also uses only a single receiver element 2, the light absorption in the article 5 relating essentially only to the measurement signal can also be registered irrespective of disturbing effects which may possibly occur and which affect the measurement signal and the reference signal.

What is claimed is:

1. An opto-electronic sensor for recognizing transparent articles, the sensor comprising at least one transmitter for transmitting light signals into a monitored region, at least one receiver for receiving the transmitted light signals and also at least one evaluation unit for the evaluation of the received signals, wherein the transmitter is designed for the transmission of light signals in the UV range, at least one reference transmitter is provided for the transmission of light signals into the monitored region, a reference receiver is provided for receiving the light signals transmitted by the reference transmitter, the evaluation unit includes a comparison unit for comparing the light signals received by the receiver and the reference receiver with each other; and the light signals transmitted by the reference transmitter lie in a different frequency range from the light signals transmitted by the transmitter; and at least one of the transmitter and the reference transmitter is formed as a semiconductor element.

2. An opto-electronic sensor in accordance with claim 1, wherein the frequency of the light signals transmitted by the reference transmitter is selected such that on striking a transparent article which is to be recognized, essentially no absorption takes place.

3. An opto-electronic sensor in accordance with claim 1, wherein the reference transmitter is designed for the transmission of light signals in the visible frequency range.

4. An opto-electronic sensor in accordance with claim 1, wherein, at least in the monitored region, the light signals transmitted by the reference transmitter pass over substantially the same optical path as the light signals transmitted by the transmitter when no article is present in the monitored region.

5. An opto-electronic sensor in accordance with claim 1, wherein the transmitter and the reference transmitter are formed by a single transmitter element which transmits light signals with different wavelengths.

6. An opto-electronic sensor in accordance with claim 1, wherein the transmitter and the reference transmitter are formed by different transmitter elements.

7. An opto-electronic sensor in accordance with claim 1, wherein the transmitter and the reference transmitter are designed for simultaneous operation.

8. An opto-electronic sensor in accordance with claim 1, wherein the receiver and the reference receiver are formed by the same receiving element.

9. An opto-electronic sensor in accordance with claim 1, wherein at least one of an optical or electronic divider is provided for separating the received signals with different wavelengths.

10. An opto-electronic sensor in accordance with claim 9, wherein the divider is formed as a dichroic divider.

11. An opto-electronic sensor in accordance with claim 9, wherein the divider is formed as a semi-permeable mirror which has one of either a high reflectivity for the UV light and a high permeability for the light transmitted by the reference transmitter, or a high permeability for the UV light and a high reflectivity for the light transmitted by the reference transmitter.

12. An opto-electronic sensor in accordance with claim 9, wherein the divider is formed as a geometrical-physical divider and filters are arranged before at least one of the receiver and the reference receiver to block the received signals associated with the other respective receiver.

13. An opto-electronic sensor in accordance with claim 1, wherein an article recognition signal is producible in dependence on the result of the comparison in the comparison unit.

14. An opto-electronic sensor in accordance with claim 1, wherein the comparison unit includes a dividing unit for the division of the level of the light signals received from the receiver and the light signals received by the reference receiver.

15. An opto-electronic sensor in accordance with claim 1, wherein at least one of the transmitter and the reference transmitter is formed for the transmission of pulse-like light signals.

16. An opto-electronic sensor in accordance with claim 1, wherein at least one of the transmitter and the reference transmitter is formed as a UV laser diode.

17. An opto-electronic sensor in accordance with claim 1, wherein at least one of the transmitter and the reference transmitter is formed as a diode which transmits blue light wherein a part of the transmitted light lies in the UV range.

18. An opto-electronic sensor in accordance with claim 1, wherein at least one of the transmitter and the reference transmitter includes an element which transmit visible light and also a frequency doubler, by which the transmitted visible light can be transformed into the UV range.

19. An opto-electronic sensor in accordance with claim 1, wherein the wavelength of the radiated UV light signals is shorter than 380 nm.

20. An opto-electronic sensor in accordance with claim 1, wherein an optical system is provided by which the light signals are at least one of transmitted and received.

21. An opto-electronic sensor in accordance with claim 20, wherein the optical system includes at least one of metal optics, mirror systems, quartz optics, diffractive optical elements (DOE) and Fresnel lenses.

22. An opto-electronic sensor in accordance with claim 1, wherein a reflection element is provided for the reflection of the transmitted light signals in the direction towards the receiver.

23. An opto-electronic sensor in accordance with claim 22, wherein the reflection element has a reflectivity which is substantially independent relative to the different wavelengths of the signals of the transmitter and of the reference transmitter.

24. An opto-electronic sensor in accordance with claim 1, wherein one of the transmitter or the reference transmitter and the receiver are optically separated from one another.

25. An opto-electronic sensor in accordance with claim 1, wherein it is built up in accordance with either the principle of pupil division or of autocollimation.

26. An opto-electronic sensor in accordance with claim 1, wherein the evaluation unit contains a threshold circuit by which an article detection signal can be produced when the received signal falls beneath a specific received signal level.

27. An opto-electronic sensor in accordance with claim 1, wherein the evaluation unit contains a circuit by which an article detection signal can be produced by direct comparison between the signal level of the receiver and the signal level of the reference receiver.

28. An opto-electronic sensor in accordance with claim 7 wherein the transmitter and the reference transmitter are designed for the simultaneous transmission of the signals having different wavelengths.

29. An opto-electronic sensor in accordance with claim 15 wherein at least one of the transmitter and the reference transmitter is formed for the transmission of the periodic light signals.

30. An opto-electronic sensor in accordance with claim 1 wherein at least one of the transmitter and the reference transmitter is formed as a diode.

31. An opto-electronic sensor in accordance with claim 16 wherein at least one of the transmitter and the reference transmitter is formed as a diode which at least emits radiation in the UV range.

32. An opto-electronic sensor in accordance with claim 16 wherein at least one of the transmitter and the reference transmitter is formed as a diode bonded to a carrier element.

33. An opto-electronic sensor in accordance with claim 19, wherein the wavelength of the radiated UV light signals is shorter than 350 nm.

34. An opto-electronic sensor in accordance with claim 33 wherein the wavelength of the radiated UV signals is shorter than 320 nm.

35. An opto-electronic sensor in accordance with claim 22 wherein the reflection element has a low signal attenuation.

36. An opto-electronic sensor in accordance with claim 22 wherein the reflection element is formed as a mirror-coated reflector.

37. An opto-electronic sensor in accordance with claim 22 wherein the reflection element is a plastic reflector.

38. An opto-electronic sensor in accordance with claim 22 wherein the reflection element is formed as a triple reflector.

39. An opto-electronic sensor in accordance with claim 38 wherein the triple reflector consists of quartz glass.

40. An opto-electronic sensor in accordance with claim 22 wherein the reflection element is formed as a reflective foil.

41. An opto-electronic sensor in accordance with claim 22 wherein the reflective foil consists of fabric with reflective spheres attached to its surface.

42. An opto-electronic sensor in accordance with claim 24 wherein one of the transmitter or the reference transmitter and the receiver are optically separated from one another by an off-axis system.

* * * * *